(12) United States Patent
Baldaro et al.

(10) Patent No.: US 8,501,932 B2
(45) Date of Patent: Aug. 6, 2013

(54) PROCEDURE FOR THE PREPARATION OF PURIFIED CATIONIC GUAR

(75) Inventors: Eva Baldaro, Milan (IT); Raffaella Pelizzari, Magenta (IT); Mauro Tenconi, Gazzada (IT); Giuseppe Li Bassi, Gavirate (IT)

(73) Assignee: Lamberti SPA, Albizzate (IT)

( * ) Notice: Subject to any disclaimer, the term of this patent is extended or adjusted under 35 U.S.C. 154(b) by 544 days.

(21) Appl. No.: 12/515,528

(22) PCT Filed: Apr. 17, 2007

(86) PCT No.: PCT/EP2007/053710
§ 371 (c)(1),
(2), (4) Date: May 19, 2009

(87) PCT Pub. No.: WO2008/058769
PCT Pub. Date: May 22, 2008

(65) Prior Publication Data
US 2010/0036114 A1  Feb. 11, 2010

(30) Foreign Application Priority Data

Nov. 17, 2006  (IT) ............................. VA2006A0069

(51) Int. Cl.
*C08B 37/00* (2006.01)

(52) U.S. Cl.
USPC ......................................... 536/124; 536/114

(58) Field of Classification Search
USPC ................................. 536/114, 124
See application file for complete search history.

(56) References Cited

U.S. PATENT DOCUMENTS

| | | | |
|---|---|---|---|
| 3,589,978 A * | 6/1971 | Kamal et al. ................. | 162/158 |
| 3,912,713 A * | 10/1975 | Boonstra et al. ............. | 536/114 |
| 4,031,307 A | 6/1977 | DeMartino et al. | |
| 4,061,602 A | 12/1977 | Oberstar et al. | |
| 5,489,674 A * | 2/1996 | Yeh ............................... | 536/114 |
| 2001/0051140 A1 | 12/2001 | Wielinga et al. | |
| 2001/0051143 A1 | 12/2001 | Cottrell et al. | |
| 2003/0044479 A1 | 3/2003 | Wielinga et al. | |
| 2003/0211952 A1 * | 11/2003 | Erazo-Majewicz et al. .. | 510/119 |

FOREIGN PATENT DOCUMENTS

| | | |
|---|---|---|
| EP | 0375126 A1 | 6/1990 |
| EP | 0686643 A1 | 12/1995 |
| EP | 0943627 A1 | 3/1999 |
| GB | 1136842 | 12/1968 |

OTHER PUBLICATIONS

Gittings et al., J. Phys. Chem. A., 2001, 105, p. 9310-9315.*
Pollard et al., Curr. Opin. Colloid Interface Sci., 2006, 11, p. 184-190.*

* cited by examiner

*Primary Examiner* — Shaojia Anna Jiang
*Assistant Examiner* — Jonathan S Lau
(74) *Attorney, Agent, or Firm* — Mossman, Kumar & Tyler, PC

(57) ABSTRACT

Procedure for the preparation of cationic guar having DS comprised between 0.01 and 3, free from boron and suitable for the use in the cosmetic field and in household cleaning products, comprising the following steps: a) 100 parts by weight of guar flour are reacted with 3-chloro-2-hydroxypropyl trimethylammonium chloride and sodium hydroxide in from 5 to 500 parts by weight of a water and alcohol mixture containing from 20 to 50% by weight of water; b) the amount of water and alcohol is regulated in order to obtain a dispersion containing from 65 to 95% by weight of a of water and alcohol mixture containing from 30 to 50% by weight of water and the dispersion is maintained under stirring at temperature comprised between 15 and 40° C. for at least 10 minutes; c) the mixture is filtered under vacuum and dried to obtain the purified cationic guar.

10 Claims, No Drawings

PROCEDURE FOR THE PREPARATION OF PURIFIED CATIONIC GUAR

TECHNICAL FIELD

The present invention relates to a procedure for the preparation of purified cationic guar free from boron and suitable for the use in the cosmetic field and in household cleaning products.

The cationic guar obtained by the procedure of the present invention has the technologically useful property, to be soluble in water both at acidic and basic pH, and therefore to develop viscosity in aqueous solutions having a very wide interval of pH; moreover it possesses a degree of purity that renders it suitable for the cosmetic field.

Cationic polysaccharides are derivatives of natural origins very used as industrial additives due to their conditioning properties (i.e. they improve the characteristics of the substrate, generally paper, skin, hair or fabric, to which they are applied on).

This characteristic renders them industrially useful for the preparation of shampoos, hair conditioners, creams, personal or household care detergents and softeners that confer a soft touch and antistatic properties to fabrics (see as an example Conditioning Agents for Hair & Skin, Ed. R. Schueller and P. Romanowski, Marcel Dekker Inc, NY, 1999).

Beside their conditioning power, the capability of these polysaccharides to thicken and regulate the rheology of the solutions in which they are dissolved is industrially useful.

In particular, cationic polygalactomannans, and among these cationic derivatives of guar gum, have shown optimal results in improving the wet and dry combability of hairs washed with a shampoo formulated therewith.

It is well known that, in cosmetic formulations, the presence of materials not expressly added and controlled, not predicted and variable from batch to batch, even if in minimal amounts, can create problems during the preparation of the formulation, such as phase separation and variations of the viscosity.

Moreover, during the last few years, particular attention has been placed to the toxicity of raw materials used for the fabrication of cosmetic products. The EC Directive 76/768/EEC and following modifications, as an example, limits or prohibits the presence of certain substances in raw materials for cosmetics, with the aim of safeguarding the consumer health.

In particular, the above cited directive prohibits the presence in cosmetic products of several substances, listed in the Attachment II, and classified as carcinogenic, mutagenic or toxic for reproduction, pertaining to categories CMR 1, CMR 2 or CMR 3, according to the EEC Directive 67/548/EEC; the presence of other substances, not necessarily present as ingredients, but only as impurities deriving from the process of production of the raw materials, is subjected to amount limitations according to the same EEC Directive 76/768/EEC (substances listed in Attached III).

It is therefore of fundamental importance that, for the use in cosmetic formulations and in formulations that come to direct contact with skin, such as in household cleaning products, the cationic derivatives of guar are as much as possible devoid of impurities, both for the consumer's health and for technological problems connected with the production of cosmetics.

Moreover the pH of cosmetic formulations and household detergents is very varied, ranging from the decidedly acid pH of scale preventers to the decidedly basic pH of hair dyes; it is therefore industrially convenient to use in these products ingredients that are soluble in water at all pHs.

BACKGROUND ART

Cationic guar derivatives are known since the early '70s, when their use is cited in the production of waterproof paper (see U.S. Pat. No. 3,589,978).

The first use of cationic guar derivatives in cosmetics goes back to 1977, when a cationic derivative of guar was used in the preparation of a so-called "two in one" shampoo, having hair conditioning characteristics beside the normal detergent power (see U.S. Pat. No. 4,061,602).

The cationic guar derivative used in cosmetic is known with the INCI name of Guar Hydroxypropyltrimonium Chloride and, chemically, is guar 2-hydroxy-3-(trimethylammonium)propyl ether chloride.

Its synthesis, described as an example in the cited U.S. Pat. No. 3,589,978, requires the reaction of 2,3-epoxypropyl trimethylammonium chloride or (3-chloro-2-hydroxypropyl) trimethylammonium chloride on the hydroxyl groups of guar, in the presence of basic catalysts (such as sodium hydroxide).

The reagent 2,3-epoxypropyl trimethyl ammonium chloride is classified as a carcinogenic substance CMR 2; the reagent 3-chloro-2-hydroxypropyl trimethylammonium chloride, even if less toxic than the corresponding epoxide, is classified as CMR 3 and in alkaline medium is converted into 2,3-epoxypropyl trimethyl ammonium chloride.

According to what is described in U.S. Pat. No. 3,589,978, the reaction can be carried out in a solvent such as isopropanol, methanol, ethanol and tert-butanol, at temperatures between 30 and 60° C.; in the Example A of the same patent, at the end of the reaction and after neutralisation of the alkali excess, the product is dried, milled and washed with methanol, in the attempt to eliminate the un-reacted quaternary reagent.

Nothing is reported in U.S. Pat. No. 3,589,978 on the residual quantities of the cationic reagent (2,3-epoxypropyl trimethyl ammonium chloride) in the final product; but we can observe that methanol is itself a toxic product.

In U.S. Pat. No. 4,031,307 the preparation of cationic derivatives of guar in a biphasic system is described, by reacting solid guar with a cationising reagent in a mixture of water and water soluble solvent that contains the basic catalyst; after the reaction, the obtained product is separated by centrifugation or filtration and preferably purified by means of a first washing with the water-solvent mixture used in synthesis, and with a second washing with a more anhydrous form of the same solvent.

In US 2001051143, the preparation of guar cationic derivatives comprising at the end of the reaction a first washing with 85% by weight aqueous isopropanol and a second washing with pure isopropanol is described; in US 2001051140 the preparation of guar cationic derivative comprising, at the end of the reaction, two washings with 85% aqueous isopropanol is described.

In all these publications, neither the type nor the amount of impurities present in the obtained cationic guar derivative is mentioned, impurities that will become part of the final cosmetic product in case the cationic guar derivative is used as a cosmetic raw material.

The greatest part of cationic guar derivatives currently on the market, in order to obviate to the difficulty and to the burden connected with the purification by washings with water and solvents, are purified by washing the product, previously cross-linked with borates, with water only, as described for example in CA 2,023,324, where in the reaction phase borax is added; the cationic guar derivatives so obtained contain small amounts of boron (borated guars).

The aim of the cross-linking with boric acid is to form bonds, through the borate anion, between the polysaccharides chains, that render the product insoluble in water.

These bonds are stable at basic pH, and therefore in such conditions the product can be washed from by-products.

In acidic conditions the bonds with the borate are removed, the product is soluble and can perform its thickening and conditioning properties.

The reaction with borates is reversible with pH changes; therefore, even if the product is pre-solubilised at acidic pH, bringing it back to alkaline conditions may cause a change in the viscosity of the formulate, varying as a consequence the quality of the product.

The limit of borated cationic guar derivatives is therefore their exclusive applicability to products to be used at acidic or slightly acidic pH, because products treated with borates are not soluble at pH greater than 7.

Furthermore, it must be observed that boric acid derivatives are classified as substances toxic for reproduction of category CMR 2.

Hair dyes represent one of the sector of the home & personal care in the greatest expansion; they are generally formulated at pH higher than 8 and therefore it is not possible to formulate them with cationic guar derivatives purified by cross-linking with boric acid.

The preparation of solid soap bars, generally having pH higher than 7.5 in aqueous solution and normally containing softening and conditioning agents for the skin, represent another field of great interest for the use of non borated cationic guar derivatives.

The preparation of depilatory creams and the production of fabric powder detergents, having generally basic pH and possibly advantageously containing a co-formulating agent having skin protective function, are further formulations in which non-borated cationic guar derivatives can be used.

The Applicant has now found a procedure for the preparation of purified cationic guar, soluble at all pHs, free from boron and with a reduced content of other impurities that can compromise the stability or the toxicological characteristics of the cosmetic formulations in which it is used as an ingredient.

DISCLOSURE OF INVENTION

It is therefore a fundamental object of the present invention a procedure for the preparation of cationic guar having DS comprised between 0.01 and 3 comprising the following steps: a) 100 parts by weight of guar flour are reacted with 3-chloro-2-hydroxypropyl trimethylammonium chloride and sodium hydroxide in from 5 to 500 parts by weight of a water and alcohol mixture containing from 20 to 50% by weight of water; b) the amount of water and alcohol is regulated in order to obtain a dispersion containing from 65 to 95% by weight of a of water and alcohol mixture containing from 30 to 50% by weight of water and the dispersion is maintained under stirring at temperature comprised between 15 and 40° C. for at least 10 minutes; c) the mixture is filtered under vacuum and dried to obtain the purified cationic guar.

The guar flour utilisable for the invention is any commercially available guar flour, preferably containing 10% by weight maximum of water.

With the expression "cationic guar" in the present text we mean guar 2-hydroxy-3-(trimethylammonium)propyl ether chloride.

In order to obtain a cationic guar having a degree of substitution (DS) comprised between 0.01 and 3 in step a) the reaction is carried out, under stirring, using from 2 to 600 parts by weight of 3-chloro-2-hydroxypropyltrimethylammonium chloride, and from 0.4 to 160 parts by weight of sodium hydroxide (or equivalent amount of other strong base).

In the present text, with the expression "degree of substitution" (DS) we mean the substitution of the cationic group on the hydroxyl groups of guar measured by means of $^1$H-NMR.

To regulate the amount of water and alcohol in step b) it is possible to add water and/or alcohol, or to remove excess water and alcohol by distillation, or to both add and distillate, or it can be neither necessary to add nor to remove anything.

In order to avoid the distillation, in step a) it is preferably to use an amount of water and alcohol mixture inferior or equal to the amount present in the dispersion of step b).

Preferably, in step a) of the procedure, from 50 to 200 parts by weight of water and alcohol mixture are used.

According to a preferred form of realisation of the present invention, in step a) of the reaction from 10 to 100 parts by weight of 3-chloro-2-hydroxypropyl trimethylammonium chloride and from 2 to 27 parts by weight of sodium hydroxyde are used, obtaining at the end of the preparation a cationic guar having a DS comprised between 0.05 and 0.5; this degree of substitution permits to obtain the best conditioning performances.

Usually, according to what is well known in the field, in step a) the reaction is carried out at a temperature comprised between 40 and 80° C. for 0.5-4 hours, regulating the pH at the end of the reaction between 4 and 10; the drying of step c) is carried out at a temperature comprised between 60 and 90° C., and after the filtration the purified cationic guar is milled.

The alcohol useful for the procedure of the invention is ethanol, isopropanol, or mixtures thereof.

According to a particularly advantageous aspect, the procedure of the invention comprises a single washing and a single filtration, and the use of relatively small amounts of water and alcohol; the cationic guar obtained is free from boron, toxic solvents and substances classified as carcinogenic, mutagenic or toxic for reproduction of category CMR 1, CMR 2 or CMR 3.

In particular the purified cationic guar obtained by means of the procedure of the invention is free from 3-chloro-2-hydroxypropyltrimethylammonium chloride and has minimum contents of 2,3-dihydroxypropyl trimethylammonium chloride (possibly formed by the reaction of 3-chloro-2-hydroxypropyltrimethylammonium chloride with water during the cationising reaction).

An advantage of the procedure according the invention is that it allows to obtain the purified cationic guar with high yields, due to the fact that the product is completely insoluble in the mixtures of water and alcohol used.

The use of the reported amount of water and alcohol is essential for this purpose, because beside guaranteeing the complete insolubility of the cationic guar, also allow to obtain of a purified product.

The determination of the cationising reagent residue and its correlated glycol is carried out by means of ion exchange chromatography, by the use of a cationic exchange column and elution with methanesulphonic acid solution.

With the expression "free from 3-chloro-2-hydroxypropyl trimethylammonium chloride" we mean that in the cationic guar of the invention the concentration of from 3-chloro-2-hydroxypropyl trimethylammonium chloride is below the detection limit of the above described method (in this case below 0.15%).

The product obtained by means of the procedure of the invention is rapidly and completely soluble at whichever pH; it can be used in the most different cosmetic formulations, where its capability to bind through its positive charges to substrates having weak negative charges, together with its capability to thicken and to regulate the rheology of water solutions are exploited.

A further advantage of the procedure of the invention is that the cationic guar so obtained contains less than 3% by weight of inorganic salts (amount determined by calcination at 700° C.) and in particular, less of 2% by weight of sodium chloride, whose presence, as it is well known, influences the effectiveness of the thickeners commonly used in the cosmetic field.

It is believed that in the procedure of the invention the use of guar in the form of flour is fundamental in order to obtain the characteristics of purity which are typical of the cationic guar of the invention.

The cationic guar of the invention is also useful in other industrial fields, where the purity characteristics of the product are of particular importance, as for example in the house care and in all those products that may come into contact with skin.

EXAMPLE 1

In a 5 liters stirred reactor, 800 g of guar flour are loaded at room temperature, the reaction atmosphere is made inert by means of vacuum/nitrogen washings, and under vigorous stirring 50 g of sodium hydroxide dissolved in 450 g of a 1/9 water/isopropanol solution are added. The stirring is continued for 30 minutes at a temperature of 50-60° C.; 224 g of 3-cloro-2-hydroxypropyl trimethylammonium chloride 85% diluted in 100 g of water are added. After 2 hours at the same temperature the reaction is cooled off to 40° C. and gaseous carbon dioxide is added until the pH is about 8.

EXAMPLE 2

A reaction mixture obtained as described in Example 1 is dispersed under stirring in 8000 g of a water and isopropanol mixture (60% by weight of alcohol); the obtained dispersion is left under stirring for 30 minutes and filtered under vacuum (0.4-0.5 atm) on a fabric filter.

The so obtained purified cationic guar is dried on a fluid bed dryer with warm air until a humidity content of approximately 3% by weight, milled and analysed.

The analytical results are reported in Table 1.

EXAMPLE 3

A reaction mixture obtained as described in Example 1 is dispersed under stirring in 8000 g of a water and ethanol mixture (60% by weight); the obtained dispersion is left under stirring for 30 minutes and filtered under vacuum (0.4-0.5 atm) on a fabric filter.

The so obtained purified cationic guar is dried on a fluid bed dryer with warm air until a humidity content of approximately 3% by weight, milled and analysed.

The analytical results are reported in Table 1.

EXAMPLE 4

A reaction mixture obtained as described in Example 1 is dispersed under stirring in 8000 g of a water and ethanol mixture (60% by weight); the obtained dispersion is left under stirring for 30 minutes and filtered under vacuum (0.4-0.5 atm) on a fabric filter.

The purified so obtained cationic guar is dried on a fluid bed dryer with warm air until a humidity content of approximately 3% by weight, milled and analysed.

The analytical results are reported in Table 1.

EXAMPLE 5 (COMPARATIVE)

A reaction mixture obtained as described in Example 1 is dispersed under stirring in 8000 g of a water and acetone mixture (60% by weight of acetone); the obtained dispersion is left under stirring for 30 minutes and filtered under vacuum (0.4-0.5 atm) on a fabric filter.

The so obtained cationic guar is dried on a fluid bed dryer with warm air until a humidity content of approximately 3% by weight, milled and analysed.

The analytical results are reported in Table 1.

EXAMPLE 6 (COMPARATIVE)

A reaction mixture obtained as described in Example 1 is dispersed under stirring in 8000 g of a water and isopropanol mixture (90% by weight of alcohol); the obtained dispersion is left under stirring for 30 minutes and filtered under vacuum (0.4-0.5 atm) on a fabric filter.

The so obtained cationic guar is dried on a fluid bed dryer with warm air until a humidity content of approximately 3% by weight, milled and analysed.

The analytical results are reported in Table 1.

EXAMPLE 7 (COMPARATIVE)

A reaction mixture obtained as described in Example 1 is dispersed under stirring in 2400 g of a water and isopropanol mixture (60% by weight of alcohol); the obtained dispersion is left under stirring for 30 minutes and filtered under vacuum (0.4-0.5 atm) on a fabric filter.

The cationic guar therefore obtained is dried on a fluid bed dryer with warm air until a humidity content approximately 3% by weight, it is therefore milled, and analysed.

The analytical results are reported in Table 1.

TABLE 1

| Ex. | Solvent | Guar/mixture | Water/solvent | Ashes | Chloridrine* | Glycol* |
|---|---|---|---|---|---|---|
| 1 | — | — | — | 8% | 0.4% | 2.7% |
| 2 | i-PrOH | 1/10 | 40/60 | 2.7% | absent | 0.5% |
| 3 | EtOH | 1/10 | 40/60 | 2.1% | absent | 0.3% |
| 4 | i-PrOH | 1/5 | 40/60 | 2.9% | absent | 0.7% |
| 5** | Acetone | 1/10 | 40/60 | 5% | absent | 1.9% |
| 6** | i-PrOH | 1/10 | 10/90 | 7% | absent | 1.6% |
| 7** | i-PrOH | 1/3 | 40/60 | 4.5% | absent | 1.3% |

*Chloridrine = 3-chloro-2-hydroxypropyl trimethylammonium chloride
Glycol = 2,3-dihydroxypropyl trimethylammonium chloride
**Comparative examples

The invention claimed is:
1. A method for the preparation of purified cationic guar (guar 2-hydroxy-3-(trimethylammonium)propyl ether chloride) having a degree of substitution of from about 0.01 and about 3 comprising:
reacting about 100 parts by weight of guar flour with 3-chloro-2-hydroxypropyl trimethylammonium chloride and sodium hydroxide in from about 5 to about 500 parts by weight of a water and alcohol mixture containing from about 20 to about 50% by weight of water;
regulating the amount of water and alcohol to obtain a dispersion containing from about 65 to about 95% by weight of a water and alcohol mixture containing from about 30 to about 50% by weight of water wherein the dispersion is maintained under stirring at temperature between about 15 and about 40° C. for at least about 10 minutes; and filtering under vacuum the dispersion to obtain a filtrate comprising the purified cationic guar.

2. The method according to claim 1, wherein the reaction of the guar flour with 3-chloro-2-hydroxypropyl trimethylammonium chloride and sodium hydroxide is carried out using from about 2 to about 600 parts by weight of 3-chloro-2-hydroxypropyltrimethylammonium chloride and from about 0.4 to about 160 parts by weight of sodium hydroxide at a temperature from about 40 and about 80° C. for from about 0.5 to about 4 hours.

3. The method according to claim 2, further comprising adjusting the pH to between about 4 and about 10 at the end of the reaction.

4. The method according to claim 1 further comprising drying the filtrate at a temperature of from about 60 to about 90° C.

5. The method according to claim 1 where the 3-chloro-2-hydroxypropyl trimethylammonium chloride and sodium hydroxide are reacted in from 50 to 200 parts by weight of the water and alcohol mixture.

6. The method according to claim 2 where the guar flour, 3-chloro-2-hydroxypropyl trimethylammonium chloride and sodium hydroxide are reacted in from about 50 to about 200 parts by weight of the water and alcohol mixture.

7. The method according to claim 1 where the alcohol is selected from the group consisting of ethanol, isopropanol, and mixtures thereof.

8. The method according to claim 2 wherein from about 10 to about 100 parts by weight of 3-chloro-2-hydroxypropyltrimethylammonium chloride and from about 2 to about 27 parts by weight of sodium hydroxide are used.

9. The method according to claim 4 wherein the filtrate, after drying, is milled.

10. The method according to claim 1 wherein the reaction of the guar flour with 3-chloro-2-hydroxypropyl trimethylammonium chloride and sodium hydroxide is done under stirring.

* * * * *